(12) United States Patent
Huang

(10) Patent No.: US 9,151,555 B1
(45) Date of Patent: Oct. 6, 2015

(54) PIN FOR A FIREARM

(71) Applicant: George Huang, Henderson, NV (US)

(72) Inventor: George Huang, Henderson, NV (US)

(*) Notice: Subject to any disclaimer, the term of this patent is extended or adjusted under 35 U.S.C. 154(b) by 143 days.

(21) Appl. No.: 13/733,995

(22) Filed: Jan. 4, 2013

(51) Int. Cl.
*F41A 11/00* (2006.01)
*F16B 15/02* (2006.01)

(52) U.S. Cl.
CPC .............. *F41A 11/00* (2013.01); *F16B 15/02* (2013.01)

(58) Field of Classification Search
USPC ......... 411/351, 408, 409, 481, 473, 474, 439, 411/399, 923; 16/417, 430, 386, DIG. 12, 16/DIG. 30; 42/75.03, 75.04
See application file for complete search history.

(56) References Cited

U.S. PATENT DOCUMENTS

| | | | | |
|---|---|---|---|---|
| 158,665 A | * | 1/1875 | Adgate | 411/454 |
| 317,090 A | * | 5/1885 | Cave | 411/487 |
| 373,291 A | * | 11/1887 | Higgs | 411/481 |
| 504,133 A | * | 8/1893 | Parkinson | 411/482 |
| 1,125,937 A | * | 1/1915 | Benet | 89/128 |
| 2,283,766 A | * | 5/1942 | Sbicca | 411/477 |
| 3,009,382 A | * | 11/1961 | Salka | 411/473 |
| D233,018 S | * | 10/1974 | Strayer | D8/391 |
| 7,937,876 B1 | | 5/2011 | Graham | |
| 8,474,169 B2 | * | 7/2013 | Cottle et al. | 42/73 |
| 8,640,372 B2 | * | 2/2014 | Hochstrate et al. | 42/75.01 |

\* cited by examiner

*Primary Examiner* — Flemming Saether
(74) *Attorney, Agent, or Firm* — Shaddock Law Group, PC

(57) ABSTRACT

A firearm pin that includes a head that extends from a shoulder to a crown, a face formed between the shoulder and the crown, wherein the face is formed at an angle of between approximately 1° and 89° relative to a longitudinal axis of the pivot pin, and a shank, wherein the shank includes an elongate, cylindrical shank portion that extends from a terminal surface to the shoulder.

15 Claims, 15 Drawing Sheets

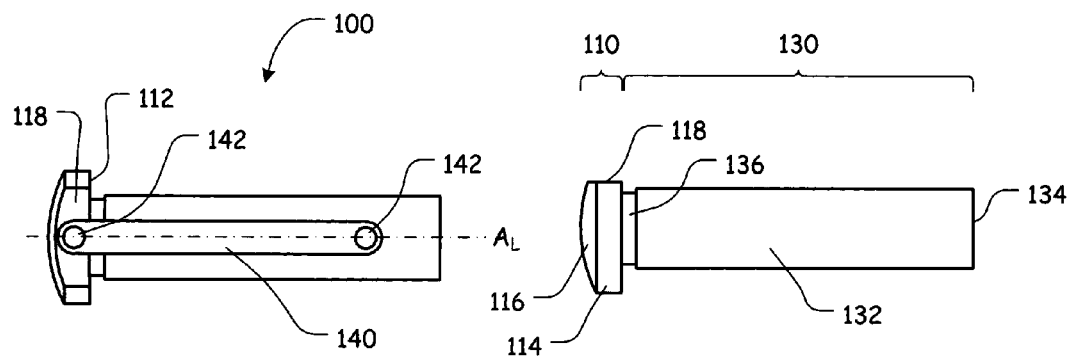
FIG. 2A PRIOR ART
FIG. 2B PRIOR ART
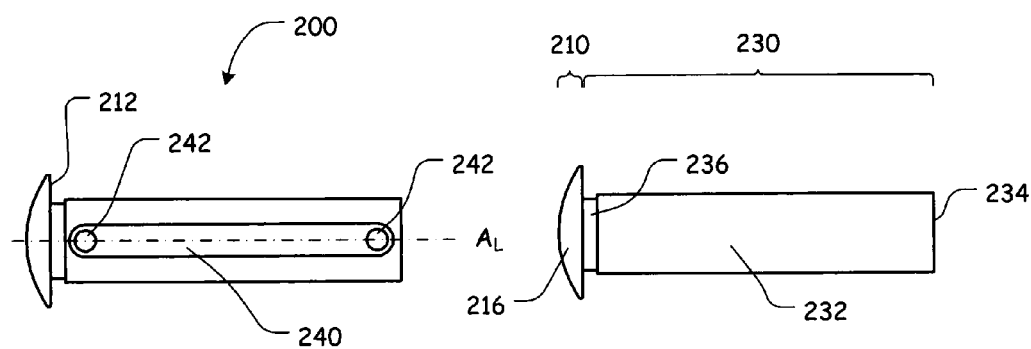
FIG. 3A PRIOR ART
FIG. 3B PRIOR ART

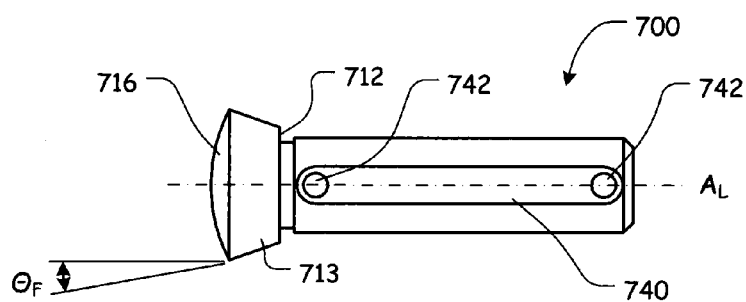
FIG. 9A
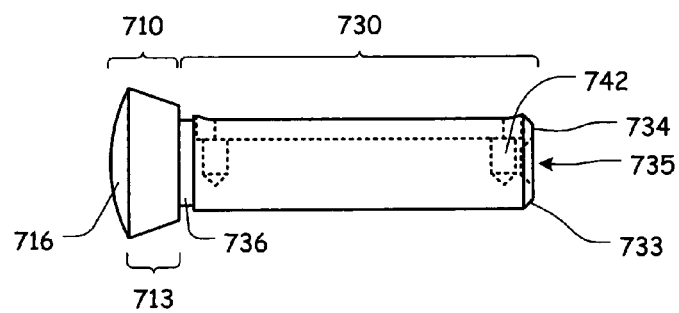
FIG. 9B
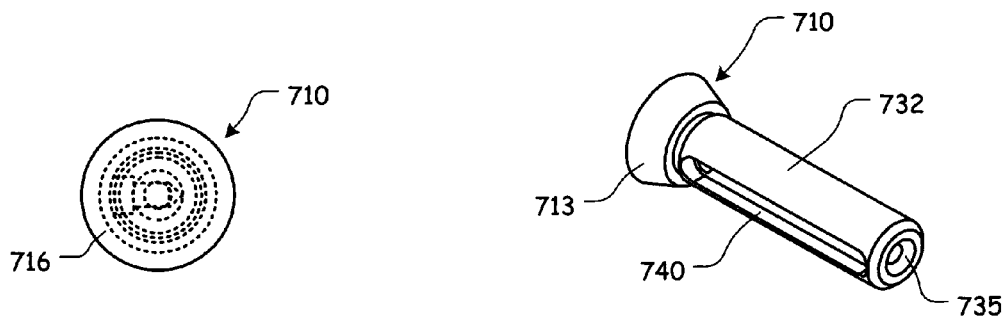
FIG. 9C
FIG. 9D

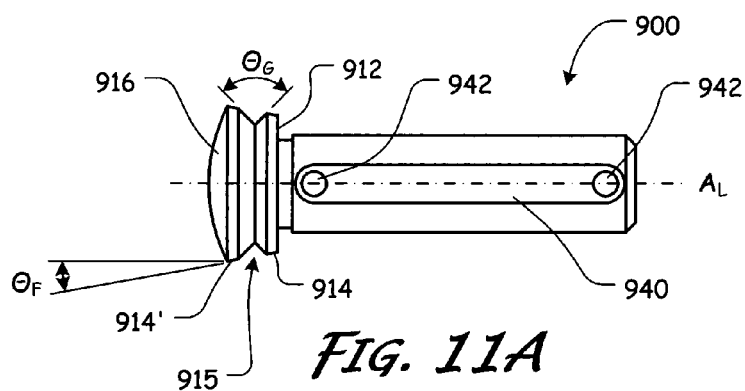
FIG. 11A
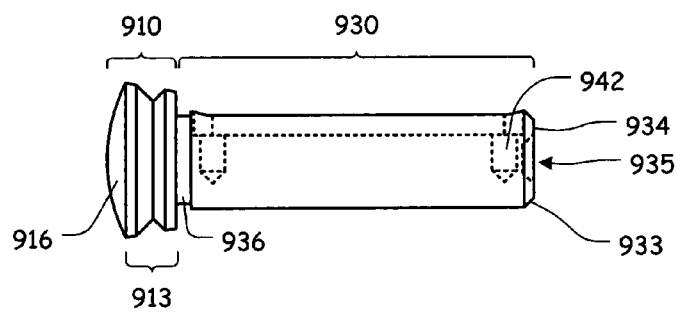
FIG. 11B
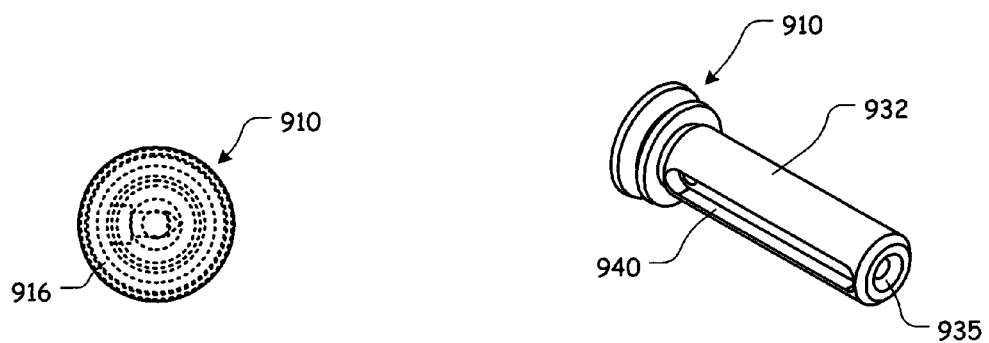
FIG. 11C
FIG. 11D

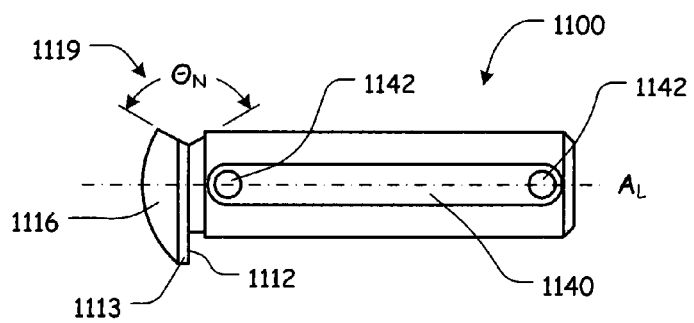
FIG. 13A
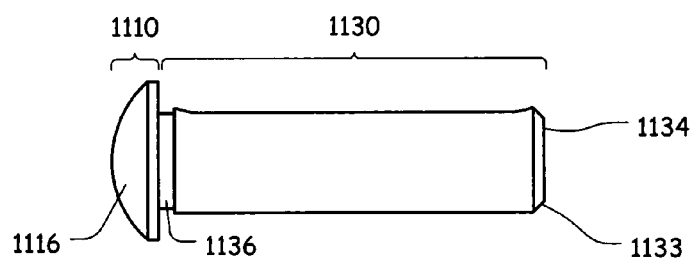
FIG. 13B
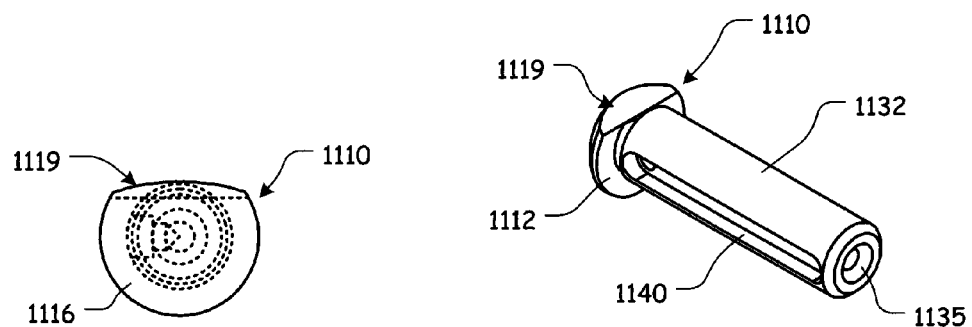
FIG. 13C
FIG. 13D

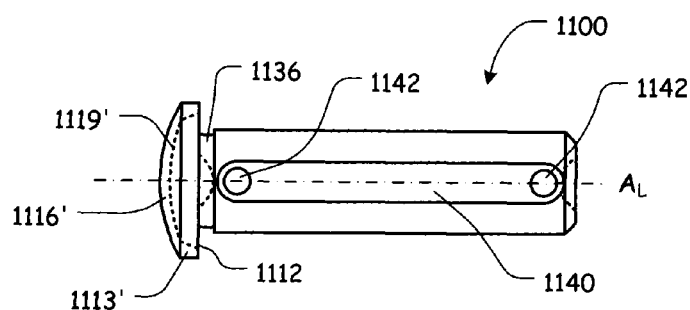
FIG. 15A
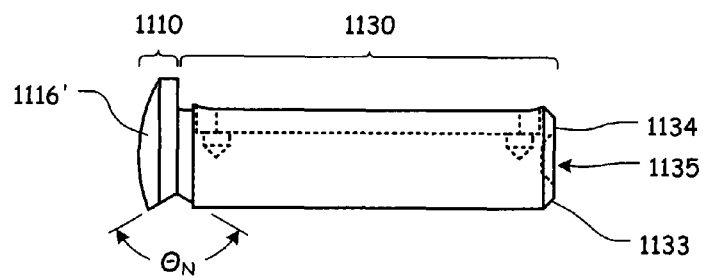
FIG. 15B
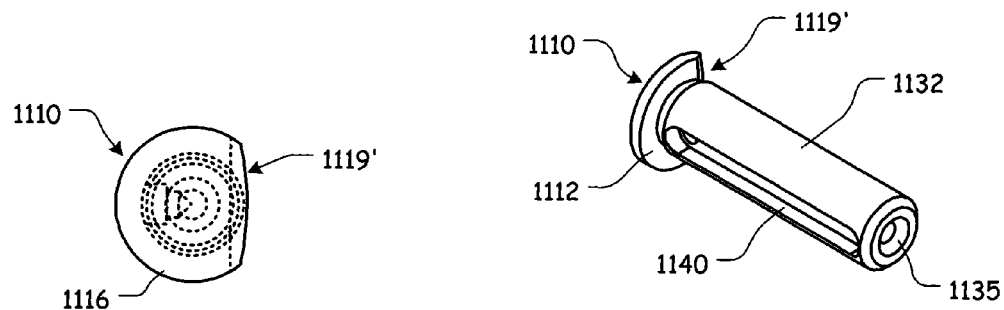
FIG. 15C
FIG. 15D

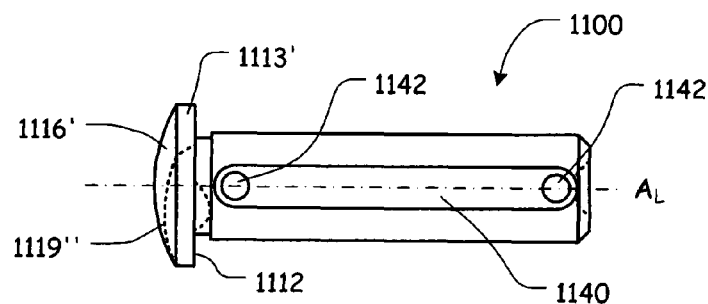
FIG. 16A
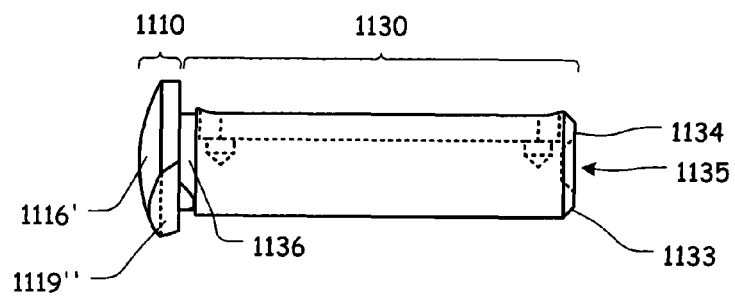
FIG. 16B
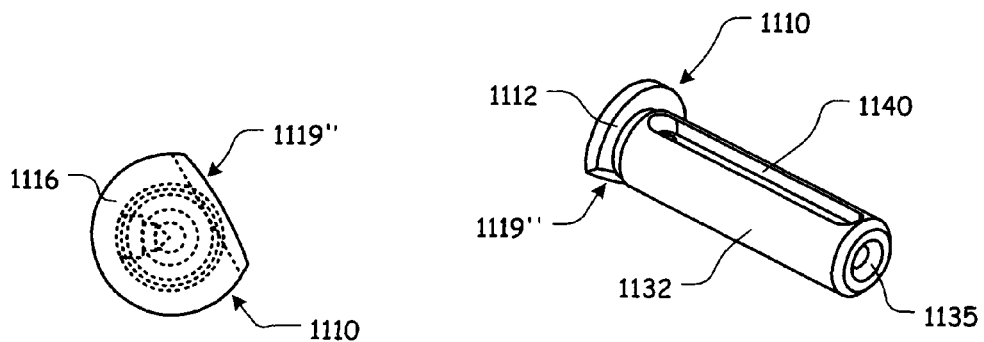
FIG. 16C
FIG. 16D

PIN FOR A FIREARM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING

Compact Disc Appendix

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of firearms. More specifically, the present invention relates to firearm pins to aid in the assembly and disassembly of firearm components.

2. Description of Related Art

Various firearms comprise certain components that are held together by one or more pins being releasably secured within apertures of the various components. One such firearm is the AR-15.

The AR-15 is based on the AR-10, which was designed by Eugene Stoner, Robert Fremont, and L. James Sullivan of the Fairchild ArmaLite corporation in 1957. Today, there are numerous variants of the AR-15 that are manufactured by a number of companies. The AR-15 and its various related derivative platforms are used by civilians, law enforcement personnel, and military forces around the world.

One of the reasons for the AR-15's widespread popularity and usage is its modularity. The AR-15 can initially be broken down into two main components, an upper receiver and a lower receiver. The upper receiver includes two lugs, each of which includes an aperture formed therethrough. The lower receiver includes cutouts for receiving the lugs of the upper receiver and appropriate apertures to be aligned with the upper receiver lug apertures. When the upper receiver and the lower receiver are appropriately aligned, pins are slidably secured within the aligned apertures to secure the upper receiver to the lower receiver.

Because the upper and lower receivers are secured with slidably movable pins, the upper receiver can optionally be pivoted on the lower receiver or removed from the lower receiver. This allows a user to access various components of the firearm more easily for cleaning and lubrication. Additionally, alternate upper receivers can be used with a single lower receiver or vice versa.

Any discussion of devices, documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

However, because of the current design of the pins used to releasably attach the upper receiver to the lower receiver, it can be difficult for a user to urge the pins from a locking position to a release position quickly and easily. This can hinder not only the user's ability to remove an upper receiver from a lower receiver, but also impede a user's/operator's ability to release one of the pins to perform maintenance on the firearm.

In order to separate firearm components that are joined using pins that have typical pin configurations can result in the user's application of excessive force to one or more pins, which can damage the pin and/or other components of the firearm. Typical pin configurations can also require use of additional tools in order to urge the pins from a locking position to a release position.

The dimensioning and shape of the various surfaces of known pins make it virtually impossible for a user to manipulate the pins from a locking position to a release position by hand, without the use of tools.

Some pins are manufactured with enlarged or "oversized" pin heads. Because these enlarged heads are significantly larger than the original pin design, they are constantly in the way of the user/operator and can easily be caught or snagged.

The oversized head on the rear take-down pin also causes a problem when the user/operator uses it with ambidextrous safety selectors. The oversized pin head is in the way of the user's/operator's thumb and the safety selector. A clean and efficient firearm should be free from such snag points. Thus, the pin of the present invention includes a head that incorporates features that allow a user/operator to manipulate the pin more easily without significantly enlarging the head of the pin, when compared to the standard, original pin size. In certain exemplary embodiments, the head of the pin of the current invention is no larger than the head of the original pin design. This is a significant difference and improvement over the various aftermarket pins.

In various exemplary, non-limiting embodiments, the firearm pins of the present invention comprise a head, wherein said head extends from a shoulder to a crown; a face formed between the shoulder and the crown, wherein the face is formed at an angle of between approximately 5° and 50° relative to a longitudinal axis of the pivot pin; and a shank, wherein said shank includes an elongate, cylindrical shank portion that extends from a terminal surface to the shoulder.

In certain exemplary, nonlimiting embodiments, the face is a single, conically shaped face. The face may comprise a continuous surface that can be substantially smooth, textured, and/or include a plurality of dimples.

In certain exemplary, nonlimiting embodiments, the pin may include a groove formed in the face.

Certain other optional features of the firearm pin include a chamfer at provides a transitional surface between a terminal surface and an outer surface of the shank portion, an indention formed in the terminating surface.

Accordingly, the presently disclosed invention provides firearm pins that can be used to secure firearm components together.

The presently disclosed invention separately provides firearm pins that optionally allow a user to urge the pins from a locking position to a release position without the use of additional tools.

The presently disclosed invention separately provides firearm pins that optionally provide a detailed or specialized surfaces for proper alignment of a tool or the tip of a round/bullet, should a user wish to use a tool or the tip of a round/bullet to urge the pins from a locking position to a release position.

The presently disclosed invention separately provides a firearm take-down pin that does not interfere with a user's/operator's thumb or access to or the operation of the safety lever.

The presently disclosed invention separately provides firearm pins that can be easily manipulated by a user.

These and other features and advantages of the presently disclosed firearm pin are described in or are apparent from the following detailed description of the exemplary, non-limiting embodiments.

BRIEF DESCRIPTION OF THE SEVERAL VIEWS OF THE DRAWINGS

As required, detailed embodiments of the present invention are disclosed herein. However, it is to be understood that the disclosed embodiments are merely exemplary of the invention that may be embodied in various and alternative forms. The figures are not necessarily to scale and some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein:

FIG. 2A illustrates a front view of a known firearm pivot pin;

FIG. 2B illustrates a left side view of a known firearm pivot pin;

FIG. 3A illustrates a front view of a known firearm take-down pin;

FIG. 3B illustrates a left side view of a known firearm take-down pin;

FIG. 9A illustrates a front view of a first exemplary embodiment of firearm take-down pin, according to this invention;

FIG. 9B illustrates a left side view of the first exemplary embodiment of firearm take-down pin, according to this invention;

FIG. 9C illustrates a top view of the first exemplary embodiment of firearm take-down pin, according to this invention;

FIG. 9D illustrates a perspective view of the first exemplary embodiment of firearm take-down pin, according to this invention;

FIG. 11A illustrates a front view of a third exemplary embodiment of firearm take-down pin, according to this invention;

FIG. 11B illustrates a left side view of the third exemplary embodiment of firearm take-down pin, according to this invention;

FIG. 11C illustrates a top view of the third exemplary embodiment of firearm take-down pin, according to this invention;

FIG. 11D illustrates a perspective view of the third exemplary embodiment of firearm take-down pin, according to this invention;

FIG. 13A illustrates a front view of a fifth exemplary embodiment of firearm take-down pin, according to this invention;

FIG. 13B illustrates a left side view of the fifth exemplary embodiment of firearm take-down pin, according to this invention;

FIG. 13C illustrates a top view of the fifth exemplary embodiment of firearm take-down pin, according to this invention;

FIG. 13D illustrates a perspective view of the fifth exemplary embodiment of firearm take-down pin, according to this invention;

FIG. 15A illustrates a front view of a seventh exemplary embodiment of firearm take-down pin, according to this invention;

FIG. 15B illustrates a left side view of the seventh exemplary embodiment of firearm take-down pin, according to this invention;

FIG. 15C illustrates a top view of the seventh exemplary embodiment of firearm take-down pin, according to this invention;

FIG. 15D illustrates a perspective view of the seventh exemplary embodiment of firearm take-down pin, according to this invention;

FIG. 16A illustrates a front view of an eighth exemplary embodiment of firearm take-down pin, according to this invention;

FIG. 16B illustrates a left side view of the eighth exemplary embodiment of firearm take-down pin, according to this invention;

FIG. 16C illustrates a top view of the eighth exemplary embodiment of firearm take-down pin, according to this invention; and FIG. 16D illustrates a perspective view of the eighth exemplary embodiment of firearm take-down pin, according to this invention.

DETAILED DESCRIPTION OF THE INVENTION

Figure 1:
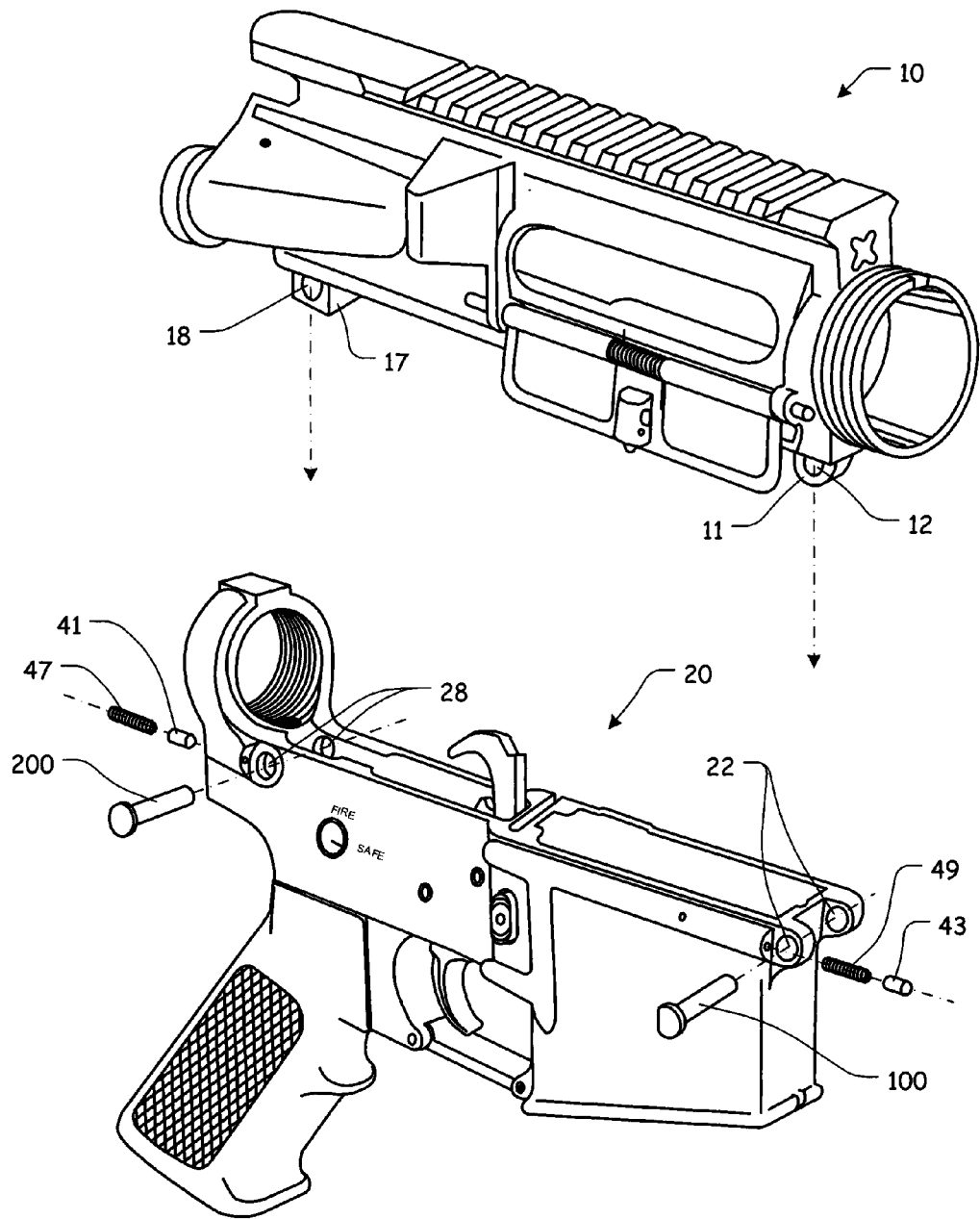
FIG. 1 illustrates a perspective view of certain components of an AR-15 style upper and lower receiver.

For simplicity and clarification, the design factors and operating principles of the firearm pins according to this invention are explained with reference to various exemplary embodiments of firearm pins according to this invention. The basic explanation of the design factors and operating principles of the firearm pins is applicable for the understanding, design, and operation of the firearm pins of this invention. It should be appreciated that the firearm pins can be adapted to many applications where two or more components are attached or coupled together using pins.

It should also be appreciated that the terms "AR-15", "firearm", "pivot pin(s)", "take-down pin(s)", and "firearm pins" are used for basic explanation and understanding of the operation of the systems, methods, and apparatuses of this invention. Therefore, the terms "AR-15", "firearm", "pivot pin(s)", "take-down pin(s)", and "firearm pins" are not to be construed as limiting the systems, methods, and apparatuses of this invention. Thus, the terms "AR-15" and "firearm" are to be understood to broadly include any firearm having two or more components capable of being attached or coupled together using pins.

For simplicity and clarification, the firearm pins of this invention will be described as being used to attach or coupled an AR-15 upper receiver to an AR-15 lower receiver. However, it should be appreciated that these are merely exemplary embodiments of the firearm pins and are not to be construed as limiting this invention. Thus, the firearm pins of this invention may be utilized to attach or coupled components of any firearm or device.

Throughout this application the word "comprise", or variations such as "comprises" or "comprising" are used. It will be understood that these terms are meant to imply the inclusion of a stated element, integer, step, or group of elements, integers, or steps, but not the exclusion of any other element, integer, step, or group of elements, integers, or steps.

Turning now to the drawing Figs., FIGS. 1-4 illustrate certain elements and/or aspects of a known, exemplary AR-15 upper receiver 10 being attached or coupled to an exemplary AR-15 lower receiver 20 using a known receiver pivot pin 100 and receiver take-down pin 200.

The pivot pin 100 comprises a head 110 and a shank 130. The shank 130 includes a shank portion 132 that extends from a planar terminal surface 134 to a shoulder 112 of the head 110. In some embodiments, an intermediate portion 136, having a reduced diameter when compared to a diameter of the shank portion 132, is formed or disposed between the shank portion 132 and the shoulder 112.

The head 110 extends from the shoulder 112 to a crown 116. In certain embodiments, a face 114, which is parallel to the longitudinal axis $A_L$, is formed or disposed between the shoulder 112 and the crown 116. A flat 118 is typically provided in a portion of the head 110. A surface of the flat 118 is generally formed parallel to a longitudinal axis $A_L$ of the pivot pin 100 so as to allow the pivot pin 100 to be appropriately inserted within the lower pivot pin apertures 22 of the lower receiver 20.

A continuous, elongate slot 140 is formed in the pivot pin 100 and extends along the longitudinal axis $A_L$ from the shank portion 132 into the head 110. A detent 142 is formed proximate each end of the slot 140.

The take-down pin 200 also comprises a head 210 and a shank 230. The shank 230 includes a shank portion 232 that extends from a planar terminal surface 234 to a shoulder 212 of the head 210. In some embodiments, an intermediate portion 236, having a reduced diameter when compared to a diameter of the shank portion 232, is formed or disposed between the shank portion 232 and the shoulder 212.

The head 210 extends from the shoulder 212 to a crown 216.

A continuous, elongate slot 240 is formed in the shank portion 232 of the take-down pin 200, along the longitudinal axis $A_L$ of the take-down pin 200. A detent 242 is formed proximate each end of the slot 240.

Generally, the upper receiver 10 includes an upper pivot pin lug 11 having an upper pivot pin aperture 12 and an upper take-down lug 17 having an upper take-down lug aperture 18. The lower receiver 20 includes cutouts, recesses, or areas for receiving the lugs 11 and 17 so that the upper pivot pin aperture 12 can be aligned with the lower pivot pin apertures 22 and the upper take-down lug aperture 18 can be aligned with the lower take-down lug apertures 28.

The receiver pivot pin 100 is usually maintained within at least one of the lower pivot pin apertures 22 via engagement of a detent pin 43 within the slot 140 of the pivot pin 100. A detent pin spring 49 provides a spring biasing force that urges the detent pin 43 into the slot 140. Once the slot 140 is engaged by the detent pin 43, the pivot pin 100 is slidably movable between a release position and a locking position, but is maintained within at least one of the lower pivot pin apertures 22.

Figure 4:
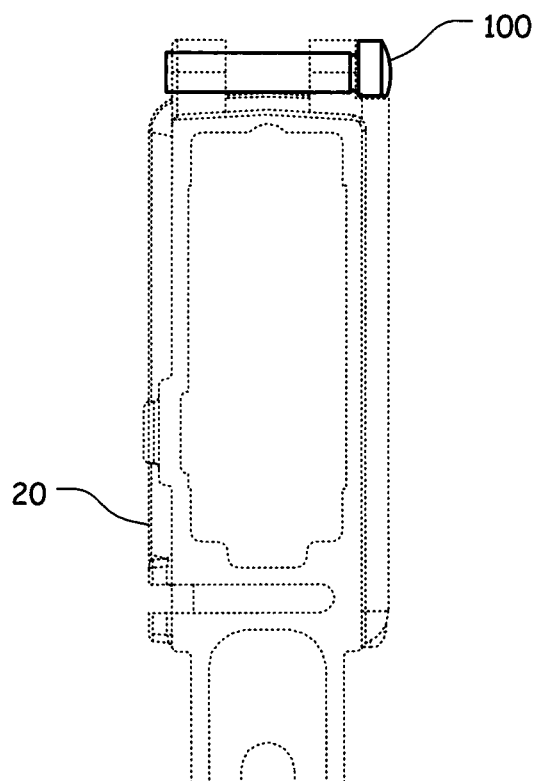
FIG. 4 illustrates a top view of a known take down pin and pivot pin positioned within a lower receiver.

When the pivot pin 100 is in the release position, the shank portion 132 is outside of the cutout between the lower pivot pin apertures 22, sufficient to allow the upper pivot pin lug 11 to be positioned within or removed from the cutout between the lower pivot pin apertures 22. Alternatively, when the pivot pin 100 is in the locking position (as illustrated in FIG. 4), at least a portion of the shank portion 132 is positioned within each of the lower pivot pin apertures 22.

The detents 142 are formed so as to be engaged by the detent pin 43 at the release position and the locking position. In this manner, additional frictional engagement is provided between the detent pin 43 and the pivot pin 100 to further secure the pivot pin 100 in the release position or the locking position.

Similarly, the receiver take-down pin 200 is usually maintained within at least one of the lower take-down pin apertures 28 via engagement of a detent pin 41 within the slot 240 of the take-down pin 200. A detent pin spring 47 provides a spring biasing force that urges the detent pin 41 into the slot 240. Once the slot 240 is engaged by the detent pin 41, the take-down pin 200 is slidably movable between a release position and a locking position, but is maintained within at least one of the lower take-down pin apertures 28.

When the take-down pin 200 is in the release position, the shank portion 232 is outside of the cutout or void between the lower take-down pin apertures 28, sufficient to allow the upper take-down pin lug 17 to be positioned within or removed from the cutout between the lower take-down pin apertures 28. Alternatively, when the take-down pin 200 is in the locking position (as illustrated in FIG. 4), at least a portion of the shank portion 232 is positioned within each of the lower take-down pin apertures 28.

The detents 242 are formed so as to be engaged by the detent pin 41 at the release position and the locking position. In this manner, additional frictional engagement is provided between the detent pin 41 and the take-down pin 200 to further secure the take-down pin 200 in the release position or the locking position.

When the upper receiver 10 and the lower receiver 20 are appropriately aligned, the upper pivot pin lug aperture 12 is aligned between the lower pivot pin lug apertures 22 such that the pivot pin 100 can be slidably moved to the locking position and the upper take-down lug aperture 18 is aligned between the lower take-down lug apertures 28 such that the take-down pin 200 can be slidably moved to the locking position. Generally, attaching the upper receiver 10 to the lower receiver 20 is accomplished by first coupling or attaching, via the pivot pin 100, the upper pivot pin lug 11 to the lower receiver 20. Then, the upper receiver 10 is pivoted, via interaction between the pivot pin 100 and the upper pivot pin lug aperture 12, until the upper take-down lug aperture 18 is appropriately aligned between the lower take-down lug apertures 28 and the take-down pin 200 is slidably moved to the locking position.

It should also be appreciated that a more detailed explanation of the components of the upper receiver 10, lower receiver 20, pivot pin 100, and take-down pin 200, instructions regarding how to attach and remove the upper receiver 10 and the lower receiver 20, methods for installing the pivot pin 100 and/or the take-down pin 200 within the lower receiver 20, and certain other items and/or techniques necessary for the implementation and/or operation of the various components of the AR-15 platform are not provided herein because such components are commercially available and/or such background information will be known to one of ordinary skill in the art. Therefore, it is believed that the level of description provided herein is sufficient to enable one of ordinary skill in the art to understand and practice the method as described.

Figure 5A:
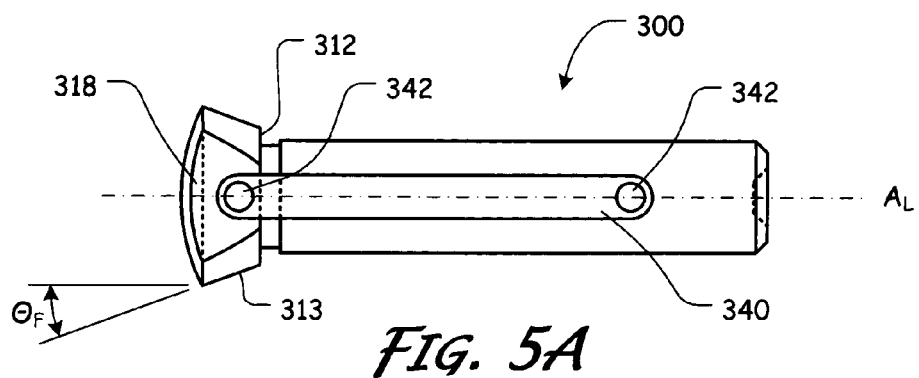
FIG. 5A illustrates a front view of a first exemplary embodiment of firearm pivot pin, according to this invention.
Figure 5B:
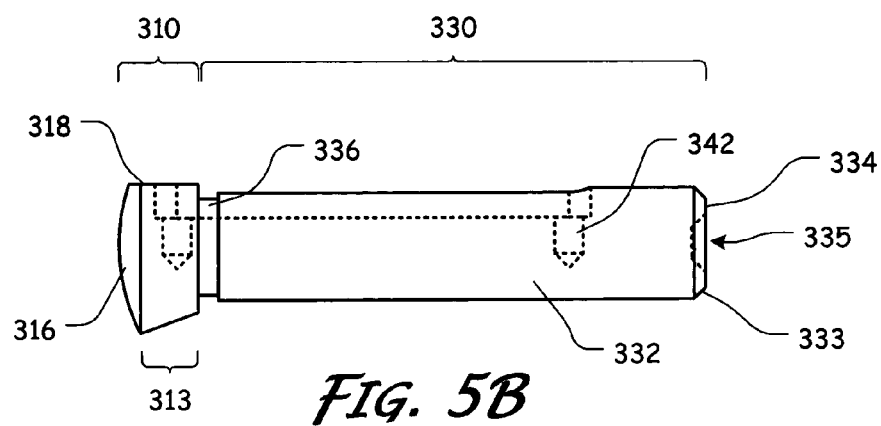
FIG. 5B illustrates a left side view of the first exemplary embodiment of firearm pivot pin, according to this invention.
Figure 5C:
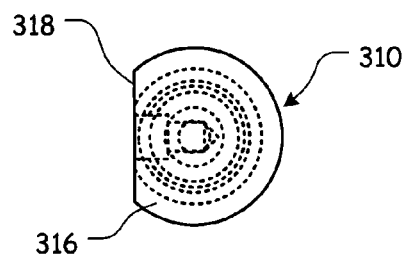
FIG. 5C illustrates a top view of the first exemplary embodiment of firearm pivot pin, according to this invention.

FIGS. 5A-5C illustrate certain elements and/or aspects of a first exemplary embodiment of a firearm pivot pin 300, according to this invention. In illustrative, non-limiting embodiment(s) of this invention, as illustrated in FIGS. 5A-5C, the pivot pin 300 comprises at least some of a head 310 and a shank 330.

The shank 330 includes an elongate, cylindrical shank portion 332 that extends from a terminal surface 334, along a longitudinal axis $A_L$ of the pivot pin 300, to a shoulder 312 of the head 310.

As illustrated, a chamfer 333 is optionally provided as a transitional surface between the terminal surface 334 and an outer surface of the shank portion 332. The chamfer 333 allows for increased ease of installation of the pivot pin 300 and also eliminates the sharp edge that would typically be found on a known pivot pin.

An indention 335 is formed in the terminating surface 334. In various exemplary embodiments, the indention 335 is of a sufficient size and depth so as to provide a recess to center a bullet or tool in a desired position relative to the terminal surface 334. In this manner, a user can engage a bullet or tool with the invention 335 such that the bullet or tool is less likely to slip off the pivot pin 300 and if used to urge the pivot pin 300 from a locking position to a release position relative to a lower receiver 20.

In certain exemplary embodiments, an intermediate portion 336, having a reduced diameter when compared to a diameter of the shank portion 332, is formed or disposed between the shank portion 332 and the shoulder 312.

The head 310 extends from the shoulder 312 to a crown 316. In various exemplary embodiments, the shoulder 312 extends from the shank portion 332 (or the intermediate portion 336, if included) perpendicular to a longitudinal axis $A_L$ of the pivot pin 300.

The crown 316 typically provides a bulbous or button shape to a terminating end portion of the head 310. However, in certain exemplary embodiments, the crown 316 may optionally comprise a recess, a planar surface, or merely a terminal surface of the face 313 (which would constitute a terminal end surface of the head 310).

It should also be appreciated that, for simplicity and clarification, the various exemplary, nonlimiting embodiments of the firearm pivot pin 300 are illustrated and/or described with reference to the crown 316 having a relatively circular profile, when viewed from a top end. However, the generally circular profile of the crown 316 is intended to be illustrative, not limiting the profile or geometry of the crown 316 to any particular shape. It should be understood that the overall profile and/or geometry of the crown 316 may comprise any overall profile or geometry, including, for example, a generally square, rectangle, triangular, pentangular, circular, oval, elliptical, elliptical torus, star, or other shape.

Therefore, it should be understood that the shape, profile, geometry texture, and/or features of the crown 316 is a design choice based, at least in part, on the desired appearance, strength, and/or functionality of the crown 316.

An elongate slot 340 is formed in the pivot pin 300 and extends along the longitudinal axis $A_L$ from the shank portion 332 into the head 310. A detent 342 is formed proximate each end of the slot 340.

A flat 318 is typically provided in a portion of the head 310. A surface of the flat 318 is generally formed parallel to a longitudinal axis $A_L$ of the pivot pin 300 and is centered relative to the slot 340 so as to allow the head 310 to be fitted adjacent structures of a lower receiver 20 such that the pivot pin 300 can be appropriately inserted within the lower pivot pin apertures 22 of the lower receiver 20. Therefore, it should be appreciated that the positioning of the flat 318 is a design choice based upon compatibility with the structures of a given lower receiver 20.

The shoulder 312 is spaced from the crown 316 and a face 313 is formed or disposed between the shoulder 312 and the crown 316. A surface of the face 313 is substantially smooth and the face 313 is formed at an angle $\theta_F$ relative to the longitudinal axis $A_L$. In certain exemplary embodiments, the angle $\theta_F$ is approximately 10°. In certain alternate exemplary embodiments, the angle $\theta_F$ is approximately 1°, 5°, 10°, 15°, 20°, 25°, 30°, 35°, 40°, 45°, 50°, 55°, 60°, 65°, 70°, 75°, 80°, 85°, or 89°. In still other exemplary embodiments, the angle $\theta_F$ is any discrete angle between approximately 1° and 89°. By providing the face 313 at such an angle relative to the longitudinal axis $A_L$, the head 310 takes on at least a partially conical shape and a user is afforded increased purchase on the head 310 of the pivot pin 300, which can aid in transitioning the pivot pin 300 from a locking position to a release position.

In certain exemplary embodiments, various components of the pivot pin 300 are formed of steel. Alternate materials of construction of the various components of the pivot pin 300 may include one or more of the following: stainless steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the pivot pin 300 is a design choice based on the desired appearance, strength, and functionality of the pivot pin 300.

It should be appreciated that certain elements of the pivot pin 300 may be formed as an integral unit (such as, for example, the head 310 and the shank 330). Alternatively, suitable materials can be used and sections or elements made independently and attached or coupled together, such as by adhesives, welding, screws, rivets, pins, or other fasteners, to form the various elements of the pivot pin 300.

It should also be understood that the overall size and shape of the pivot pin 300, and the various portions thereof, is a design choice based upon the desired functionality, appearance, and/or compatibility of the pivot pin 300.

Figure 6A:
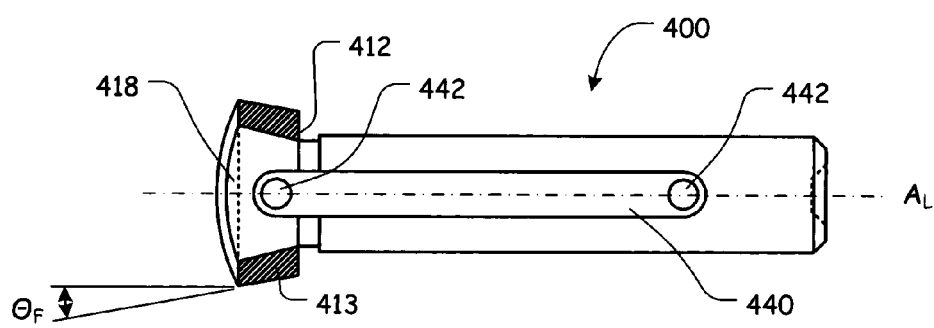
FIG. 6A illustrates a front view of a second exemplary embodiment of firearm pivot pin, according to this invention.
Figure 6B:
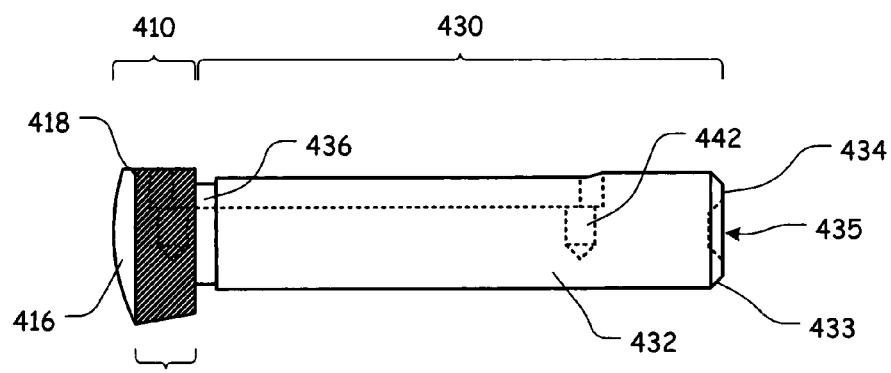
FIG. 6B illustrates a left side view of the second exemplary embodiment of firearm pivot pin, according to this invention.
Figure 6C:
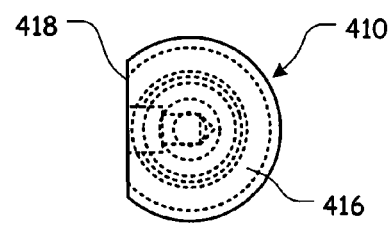
FIG. 6C illustrates a top view of the second exemplary embodiment of firearm pivot pin, according to this invention.

FIGS. 6A-6C illustrate certain elements and/or aspects of a second exemplary embodiment of a firearm pivot pin 400, according to this invention. As illustrated in FIGS. 6A-6C, the pivot pin 400 includes at least some of a head 410, a shank 430, a shank portion 432, a terminal surface 434, a shoulder 412, a chamfer 433, an indention 435, an intermediate portion 436, a crown 416, an elongate slot 440, detents 442, a flat 418, and a face 413.

It should be understood that each of these elements corresponds to and operates similarly to the head 310, the shank 330, the shank portion 332, the terminal surface 334, the shoulder 312, the chamfer 333, the indention 335, the intermediate portion 336, the crown 316, the elongate slot 340, the detents 342, the flat 318, and the face 313, as described above with reference to the pivot pin 300 of FIGS. 5A-5C.

However, as illustrated in FIGS. 6A-6C, the surface of the face 413 is textured to provide greater purchase on the head 410 of the pivot pin 400. The surface of the face 413 may be textured using, for example, stippling, knurling, checkering, annular rings, or other patterns. Providing texture to the surface of the face 413 can aid in transitioning the pivot pin 400 from a locking position to a release position.

Figure 7A:
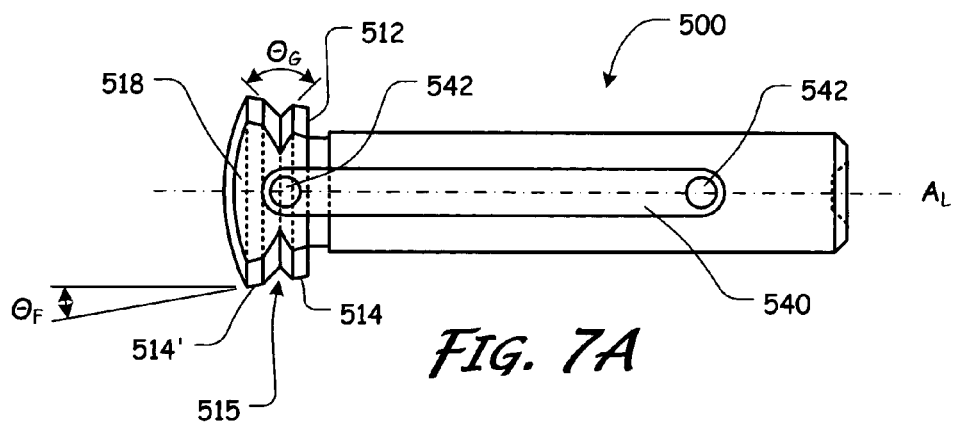
FIG. 7A illustrates a front view of a third exemplary embodiment of firearm pivot pin, according to this invention.
Figure 7B:
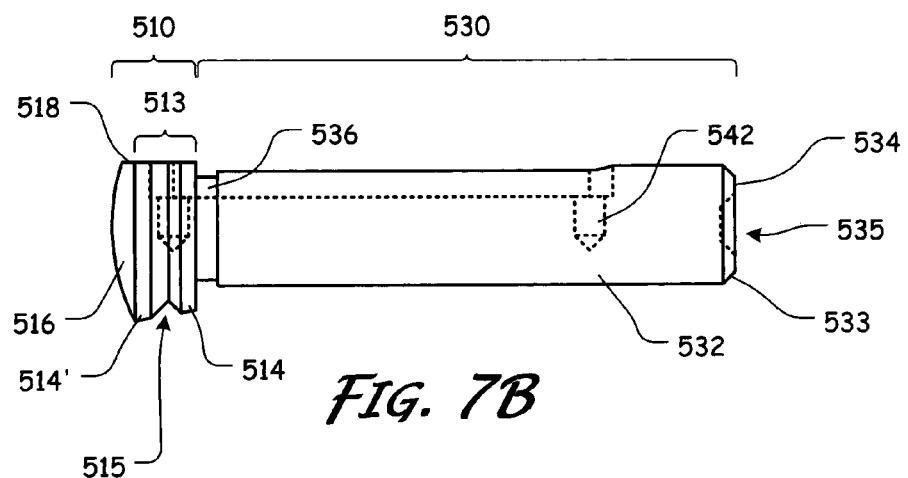
FIG. 7B illustrates a left side view of the third exemplary embodiment of firearm pivot pin, according to this invention.
Figure 7C:
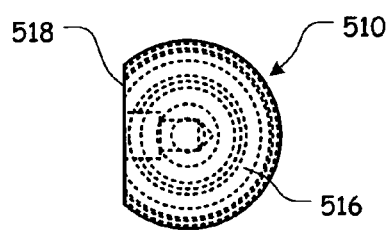
FIG. 7C illustrates a top view of the third exemplary embodiment of firearm pivot pin, according to this invention.

FIGS. 7A-7C illustrate certain elements and/or aspects of a third exemplary embodiment of a firearm pivot pin 500, according to this invention. As illustrated in FIGS. 7A-7C, the pivot pin 500 includes at least some of a head 510, a shank 530, a shank portion 532, a terminal surface 534, a shoulder 512, a chamfer 533, an indention 535, an intermediate portion 536, a crown 516, an elongate slot 540, detents 542, a flat 518, and a face 513.

It should be understood that each of these elements corresponds to and operates similarly to the head 310, the shank 330, the shank portion 332, the terminal surface 334, the shoulder 312, the chamfer 333, the indention 335, the intermediate portion 336, the crown 316, the elongate slot 340, the detents 342, the flat 318, and the face 313, as described above with reference to the pivot pin 300 of FIGS. 5A-5C. Furthermore, the surface of the face 513 may or may not be textured to provide greater purchase on the head 510 of the pivot pin 500.

However, as illustrated in FIGS. 7A-7C, a V-shaped groove 515 is formed in the face 513 to provide greater purchase on the head 510 of the pivot pin 500. In various exemplary, nonlimiting embodiments, the groove 515 is formed such that the side walls of the groove 515 are at an angle $\theta_G$ relative to one another and the side walls of the groove 515 converge with each other. It should be appreciated that as the groove 515 is viewed in cross section, the side walls converge at a point. As the groove 515 is formed around the face 513, the side walls of the groove 515 converge along a line. In certain exemplary embodiments, the angle $\theta_G$ is approximately 90°. In still other exemplary embodiments, the angle $\theta_G$ is any discrete angle between approximately 45° and 135°.

The groove 515 is positioned so as to divide the face 513 and create a first face portion 514 and a second face portion 514'. It should be appreciated that the surface of the first face portion 514 and/or the second face portion 514' may be substantially smooth or maybe textured using, for example, stippling, knurling, checkering, annular rings, or other patterns.

While the groove 515 is illustrated and described as being a V-shaped groove 515 having a V-shaped profile, it should be understood that the groove 515 may have a V, U, square, rectangular, round, semi-round, oval, angled, or other desired profile.

By providing the groove 515, an additional feature is provided to allow better purchase on the head 510 of the pivot pin 500.

Figure 8A:
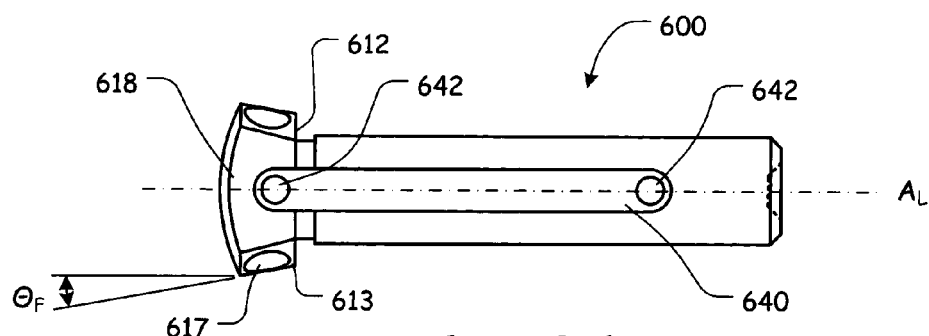
FIG. 8A illustrates a front view of a fourth exemplary embodiment of firearm pivot pin, according to this invention.
Figure 8B:
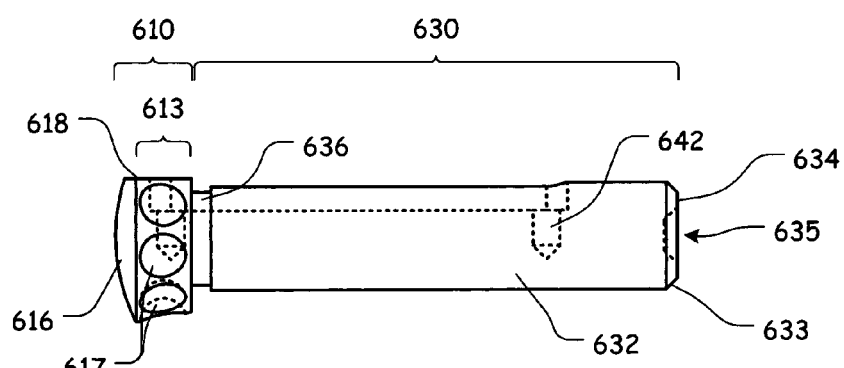
FIG. 8B illustrates a left side view of the fourth exemplary embodiment of firearm pivot pin, according to this invention.
Figure 8C:
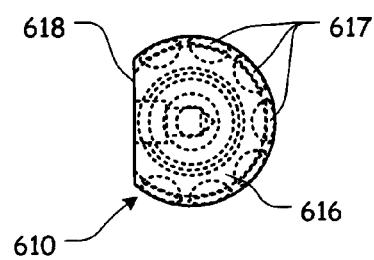
FIG. 8C illustrates a top view of the fourth exemplary embodiment of firearm pivot pin, according to this invention.
Figure 10A:
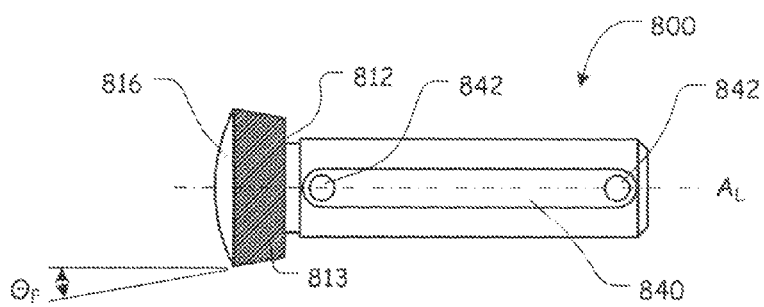
FIG. 10A illustrates a front view of a second exemplary embodiment of firearm take-down pin, according to this invention.
Figure 10B:
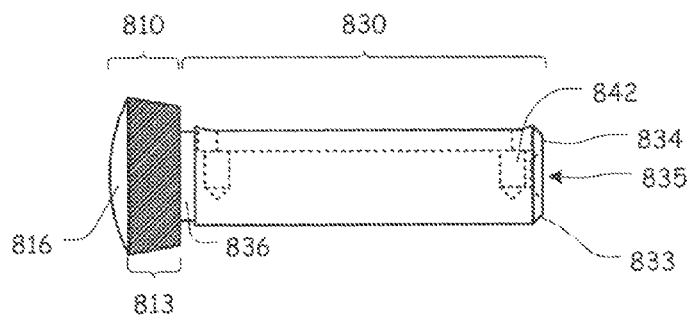
FIG. 10B illustrates a left side view of the second exemplary embodiment of firearm take-down pin, according to this invention.
Figure 10C:
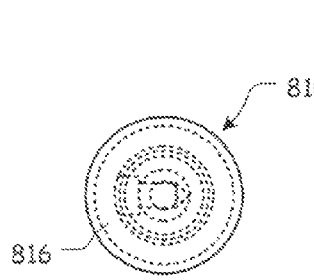
FIG. 10C illustrates a top view of the second exemplary embodiment of firearm take-down pin, according to this invention.
Figure 10D:
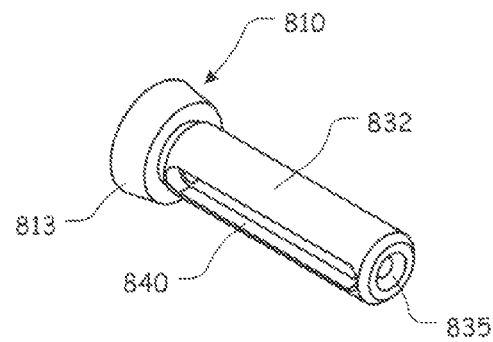
FIG. 10D illustrates a perspective view of the second exemplary embodiment of firearm take-down pin, according to this invention.
Figure 12A:
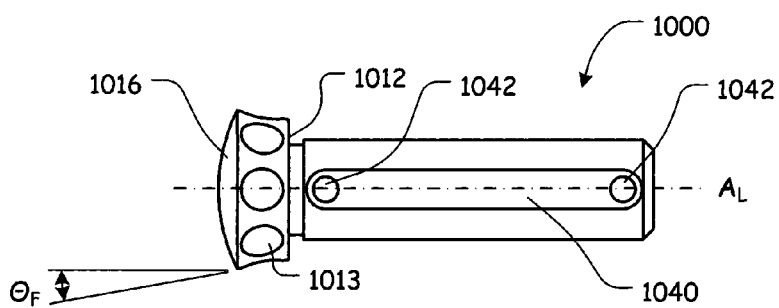
FIG. 12A illustrates a front view of a fourth exemplary embodiment of firearm take-down pin, according to this invention.
Figure 12B:
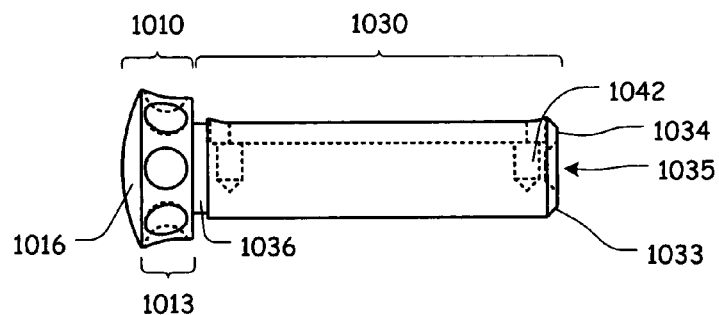
FIG. 12B illustrates a left side view of the fourth exemplary embodiment of firearm take-down pin, according to this invention.
Figures 12C, 12D:
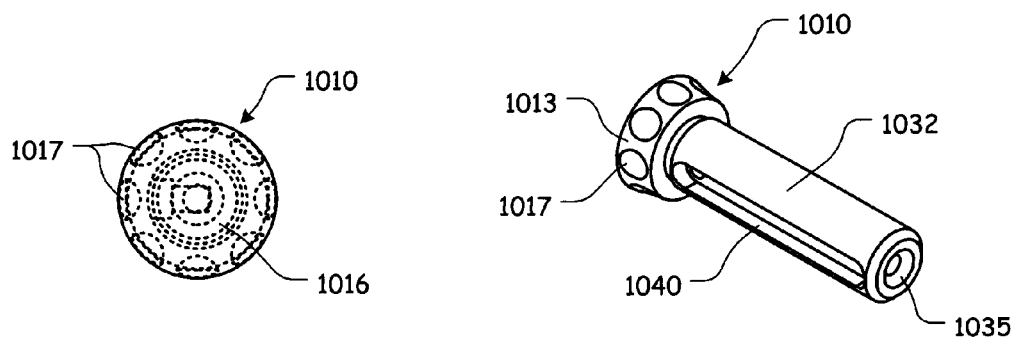
FIG. 12C illustrates a top view of the fourth exemplary embodiment of firearm take-down pin, according to this invention.
FIG. 12D illustrates a perspective view of the fourth exemplary embodiment of firearm take-down pin, according to this invention.
Figure 14A:
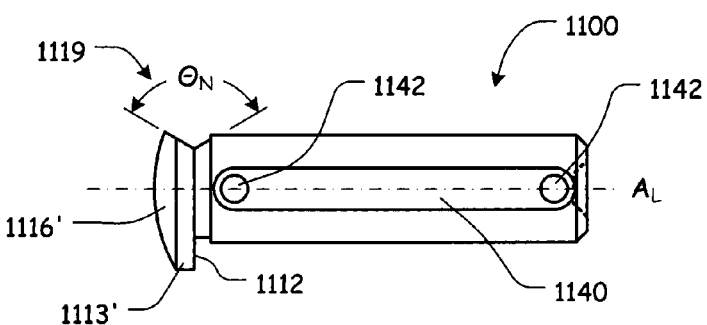
FIG. 14A illustrates a front view of a sixth exemplary embodiment of firearm take-down pin, according to this invention.
Figure 14B:
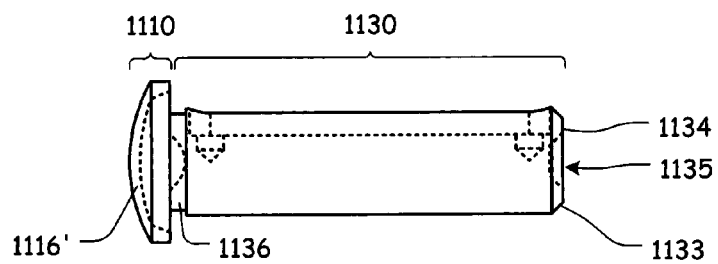
FIG. 14B illustrates a left side view of the sixth exemplary embodiment of firearm take-down pin, according to this invention.
Figures 14C, 14D:
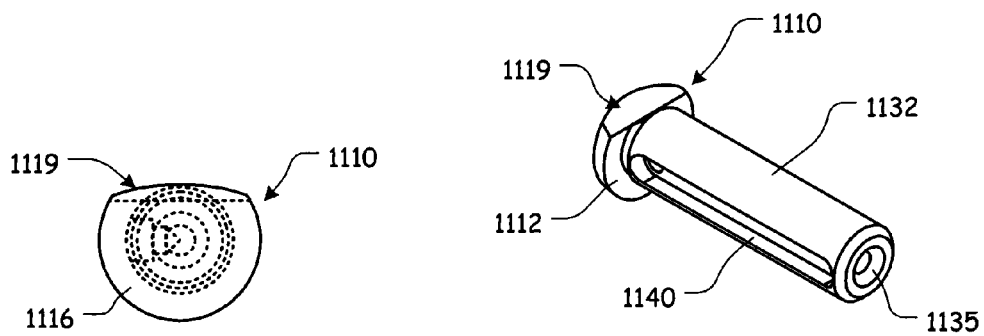
FIG. 14C illustrates a top view of the sixth exemplary embodiment of firearm take-down pin, according to this invention.
FIG. 14D illustrates a perspective view of the sixth exemplary embodiment of firearm take-down pin, according to this invention.

FIGS. 8A-8C illustrate certain elements and/or aspects of a fourth exemplary embodiment of a firearm pivot pin 600, according to this invention. As illustrated in FIGS. 8A-8C, the pivot pin 600 includes at least some of a head 610, a shank 630, a shank portion 632, a terminal surface 634, a shoulder 612, a chamfer 633, an indention 635, an intermediate portion 636, a crown 616, an elongate slot 640, detents 642, a flat 618, and a face 613.

It should be understood that each of these elements corresponds to and operates similarly to the head 310, the shank 330, the shank portion 332, the terminal surface 334, the shoulder 312, the chamfer 333, the indention 335, the intermediate portion 336, the crown 316, the elongate slot 340, the detents 342, the flat 318, and the face 313, as described above with reference to the pivot pin 300 of FIGS. 5A-5C.

However, as illustrated in FIGS. 8A-8C, a plurality of dimples 617 are formed in the face 613 to provide greater purchase on the head 610 of the pivot pin 600. In various exemplary, nonlimiting embodiments, the dimples 617 comprise evenly spaced spherical recesses formed in the face 613. In certain exemplary embodiments the dimples 617 may comprise other spaced recesses, such as, for example, pyramidal recesses, conical recesses, prismic recesses, cylindrical recesses, or other patterned recesses formed in the face 613.

FIGS. 9A-9D illustrate certain elements and/or aspects of a first exemplary embodiment of a firearm take-down pin 700, according to this invention. In illustrative, non-limiting embodiment(s) of this invention, as illustrated in FIGS. 9A-9D, the take-down pin 700 comprise at least some of a head 710 and a shank 730.

The shank 730 includes an elongate, cylindrical shank portion 732 that extends from a terminal surface 734, along a longitudinal axis $A_L$ of the take-down pin 700, to a shoulder 712 of the head 710.

As illustrated, a chamfer 733 is optionally provided as a transitional surface between the terminal surface 734 and an outer surface of the shank portion 732. The chamfer 733 allows for increased ease of installation of the take-down pin 700 and also eliminates the sharp edge that would typically be found on a known pivot pin.

An indention 735 is formed in the terminating surface 734. In various exemplary embodiments, the indention 735 is of a sufficient size and depth so as to provide a recess to center a bullet or tool in a desired position relative to the terminal surface 734. In this manner, a user can engage a bullet or tool with the invention 735 such that the bullet or tool is less likely to slip off the take-down pin 700 and if used to urge the take-down pin 700 from a locking position to a release position relative to a lower receiver 20.

In certain exemplary embodiments, an intermediate portion 736, having a reduced diameter when compared to a diameter of the shank portion 732, is formed or disposed between the shank portion 732 and the shoulder 712.

The head 710 extends from the shoulder 712 to a crown 716. In various exemplary embodiments, the shoulder 712 extends from the shank portion 732 (or the intermediate portion 736, if included) perpendicular to a longitudinal axis $A_L$ of the take-down pin 700.

The crown 716 typically provides a bulbous or button shape to a terminating end portion of the head 710. However, in certain exemplary embodiments, the crown 716 may optionally comprise a recess, a planar surface, or merely a terminal surface of the face 713 (which would constitute a terminal end surface of the head 710).

It should also be appreciated that, for simplicity and clarification, the various exemplary, nonlimiting embodiments of the firearm take-down pin 700 are illustrated and/or described with reference to the crown 716 having a relatively circular profile, when viewed from a top end. However, the generally circular profile of the crown 716 is intended to be illustrative, not limiting the profile or geometry of the crown 716 to any particular shape. It should be understood that the overall profile and/or geometry of the crown 716 may comprise any overall profile or geometry, including, for example, a generally square, rectangle, triangular, pentangular, circular, oval, elliptical, elliptical torus, star, or other shape.

Therefore, it should be understood that the shape, profile, geometry texture, and/or features of the crown 716 is a design choice based, at least in part, on the desired appearance, strength, and/or functionality of the crown 716.

An elongate slot 740 is formed in the take-down pin 700 and extends along the longitudinal axis $A_L$ within the shank portion 732. A detent 742 is formed proximate each end of the slot 740.

The shoulder 712 is spaced from the crown 716 and a face 713 is formed or disposed between the shoulder 712 and the crown 716. A surface of the face 713 is substantially smooth and the face 713 is formed at an angle $\theta_F$ relative to the longitudinal axis $A_L$. In certain exemplary embodiments, the angle $\theta_F$ is approximately 10°. In certain alternate exemplary embodiments, the angle $\theta_F$ is approximately 1°, 5°, 10°, 15°, 20°, 25°, 30°, 35°, 40°, 45°, 50°, 55°, 60°, 65°, 70°, 75°, 80°, 85°, or 89°. In still other exemplary embodiments, the angle $\theta_F$ is any discrete angle between approximately 1° and 89°. By providing the face 713 at such an angle relative to the longitudinal axis $A_L$, the head 710 takes on at least a partially conical shape and a user is afforded increased purchase on the head 710 of the take-down pin 700, which can aid in transitioning the take-down pin 700 from a locking position to a release position.

In certain exemplary embodiments, various components of the take-down pin 700 are formed of steel. Alternate materials of construction of the various components of the take-down pin 700 may include one or more of the following: stainless steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the take-down pin 700 is a design choice based on the desired appearance, strength, and functionality of the take-down pin 700.

It should be appreciated that certain elements of the take-down pin 700 may be formed as an integral unit (such as, for example, the head 710 and the shank 730). Alternatively, suitable materials can be used and sections or elements made independently and attached or coupled together, such as by adhesives, welding, screws, rivets, pins, or other fasteners, to form the various elements of the take-down pin 700.

It should also be understood that the overall size and shape of the take-down pin 700, and the various portions thereof, is a design choice based upon the desired functionality, appearance, and/or compatibility of the take-down pin 700.

FIGS. 10A-10D illustrate certain elements and/or aspects of a second exemplary embodiment of a firearm take-down pin 800, according to this invention. As illustrated in FIGS. 10A-10D, the take-down pin 800 includes at least some of a head 810, a shank 830, a shank portion 832, a terminal surface 834, a shoulder 812, a chamfer 833, an indention 835, an intermediate portion 836, a crown 816, an elongate slot 840, detents 842, and a face 813.

It should be understood that each of these elements corresponds to and operates similarly to the head 710, the shank 730, the shank portion 732, the terminal surface 734, the shoulder 712, the chamfer 733, the indention 735, the intermediate portion 736, the crown 716, the elongate slot 740, the detents 742, and the face 713, as described above with reference to the take-down pin 700 of FIGS. 9A-9D.

However, as illustrated in FIGS. 10A-10D, the surface of the face 813 is textured to provide greater purchase on the head 810 of the take-down pin 800. The surface of the face 813 may be textured using, for example, stippling, knurling, checkering, annular rings, or other patterns. Providing texture to the surface of the face 813 can aid in transitioning the take-down pin 800 from a locking position to a release position.

FIGS. 11A-11D illustrate certain elements and/or aspects of a third exemplary embodiment of a firearm take-down pin 900, according to this invention. As illustrated in FIGS. 11A-11D, the take-down pin 900 includes at least some of a head 910, a shank 930, a shank portion 932, a terminal surface 934, a shoulder 912, a chamfer 933, an indention 935, an intermediate portion 936, a crown 916, an elongate slot 940, detents 942, and a face 913.

It should be understood that each of these elements corresponds to and operates similarly to the head 710, the shank 730, the shank portion 732, the terminal surface 734, the shoulder 712, the chamfer 733, the indention 735, the intermediate portion 736, the crown 716, the elongate slot 740, the detents 742, and the face 713, as described above with reference to the take-down pin 700 of FIGS. 9A-9D. Furthermore, the surface of the face 913 may or may not be textured to provide greater purchase on the head 910 of the take-down pin 900.

However, as illustrated in FIGS. 11A-11D, a groove 915 is formed in the face 913 to provide greater purchase on the head 910 of the take-down pin 900. In various exemplary, nonlimiting embodiments, the groove 915 is formed such that the side walls of the groove 915 are at an angle $\theta_G$ relative to one another and the side walls of the groove 915 converge with each other. It should be appreciated that as the groove 915 is viewed in cross section, the side walls converge at a point. As the groove 915 is formed around the face 913, the side walls of the groove 915 converge along a line. In certain exemplary embodiments, the angle $\theta_G$ is approximately 90°. In other exemplary embodiments, the angle $\theta_G$ is any discrete angle between approximately 45° and 135°. In still other exemplary embodiments, the angle $\theta_G$ is any discrete angle between approximately 1° and 179°.

The groove 915 is positioned so as to divide the face 913 and create a first face portion 914 and a second face portion 914'. It should be appreciated that the surface of the first face portion 914 and/or the second face portion 914' may be substantially smooth or maybe textured using, for example, stippling, knurling, checkering, annular rings, or other patterns.

While the groove 515 is illustrated and described as being a V-shaped groove 515 having a V-shaped profile, it should be understood that the groove 515 may have a V, U, square, rectangular, round, semi-round, oval, angled, or other desired profile.

By providing the groove 915, an additional feature is provided to allow better purchase on the head 910 of the take-down pin 900.

FIGS. 12A-12D illustrate certain elements and/or aspects of a fourth exemplary embodiment of a firearm take-down pin 1000, according to this invention. As illustrated in FIGS. 12A-12D, the take-down pin 1000 includes at least some of a head 1010, a shank 1030, a shank portion 1032, a terminal surface 1034, a shoulder 1012, a chamfer 1033, an indention 1035, an intermediate portion 1036, a crown 1016, an elongate slot 1040, detents 1042, and a face 1013.

It should be understood that each of these elements corresponds to and operates similarly to the head 710, the shank 730, the shank portion 732, the terminal surface 734, the shoulder 712, the chamfer 733, the indention 735, the intermediate portion 736, the crown 716, the elongate slot 740, the detents 742, and the face 713, as described above with reference to the take-down pin 700 of FIGS. 9A-9D.

However, as illustrated in FIGS. 12A-12D, a plurality of dimples 1017 are formed in the face 1013 to provide greater purchase on the head 1010 of the take-down pin 1000. In various exemplary, nonlimiting embodiments, the dimples 1017 comprise evenly spaced spherical recesses formed in the face 1013. In certain exemplary embodiments the dimples 1017 may comprise other spaced recesses, such as, for example, pyramidal recesses, conical recesses, prismic recesses, cylindrical recesses, or other patterned recesses formed in the face 1013.

FIGS. 13A-13D illustrate certain elements and/or aspects of a fifth exemplary embodiment of a firearm take-down pin 1100, according to this invention. As illustrated in FIGS. 13A-13D, the take-down pin 1100 includes at least some of a head 1110, a shank 1130, a shank portion 1132, a terminal surface 1134, a shoulder 1112, a chamfer 1133, an indention 1135, an intermediate portion 1136, a crown 1116, an elongate slot 1140, detents 1142, and a face 1113.

It should be understood that each of these elements corresponds to and operates similarly to the head 710, the shank 730, the shank portion 732, the terminal surface 734, the shoulder 712, the chamfer 733, the indention 735, the intermediate portion 736, the crown 716, the elongate slot 740, the detents 742, and the face 713, as described above with reference to the take-down pin 700 of FIGS. 9A-9D.

However, as illustrated in FIGS. 13A-13D, the shoulder 1112 is spaced from the crown 1116 and a face 1113 is formed or disposed between the shoulder 1112 and the crown 1116. The face 1113, as opposed to the face 713, is formed parallel to or substantially parallel to the longitudinal axis $A_L$.

Additionally, a planar flat cut or V-shaped notch 1119 is formed across at least the face 1113 and the crown 1116 to provide greater purchase on the head 1110 of the take-down pin 1100. In various exemplary, nonlimiting embodiments, the notch 1119 is also formed across a portion of the intermediate portion 1136 (if included).

In various exemplary, nonlimiting embodiments, the notch 1119 is formed such that the side walls of the notch 1119 are at an angle $\theta_N$ relative to one another. At least one of the side walls is a planar side wall that bisects the head 1110. In certain exemplary embodiments the angle $\theta_N$ is approximately 60°. In other exemplary embodiments, the angle $\theta_N$ is approximately 45°, 50°, 60°, 70°, 80°, 90°, 100°, 110°, 120°, 130°, or 135°. In other exemplary embodiments, the angle $\theta_N$ is any discrete angle between approximately 45° and 135°. In still other exemplary embodiments, the angle $\theta_N$ is any discrete angle between approximately 1° and 179°.

In certain exemplary embodiments, the notch 1119 is created by a flat surface formed through at least a portion of the face 1113 and the crown 1116 at approximately 45° relative to the longitudinal axis $A_L$.

FIGS. 14A-16D illustrate certain exemplary variations of the firearm take-down pin 1100. As shown in FIGS. 14A-16D, the face 1113' is extended (when compared to the face 1113) and the profile of the crown 1116' is altered (when compared to the crown 1116).

It should be appreciated that the proportion of the face 1113 or 1113' is a design choice based on the desired appearance, compatibility, and/or functionality of the take-down pin 1100. Likewise, the size and overall shape of the crown 1116 or 1116' is a design choice based on the desired appearance, compatibility, and/or functionality of the take-down pin 1100.

FIGS. 15A-15D, show the notch 1119' being formed at a relative 3 o'clock position while FIGS. 16A-16D, show the notch 1119" being formed at a relative 1:30 position, when viewed as installed in the lower receiver 20.

It should be appreciated that while notch 1119 is illustrated as being formed such that an edge of the flat cut or the vertex of the V-shaped notch 1119 extends perpendicular to a 12 o'clock position, notch 1119' is illustrated as being formed such that an edge of the flat cut or the vertex of the V-shaped notch 1119' extends perpendicular to a 3 o'clock position, and the notch 1119" is illustrated as being formed such that an edge of the flat cut or the vertex of the V-shaped notch 1119" extends perpendicular to a 1:30 position (when viewed as installed in the lower receiver 20), the notch 1119, 1119', or 1119" may be formed at any desired rotational or angular position.

While the notches 1119, 1119', and 1119" are illustrated and described as being V-shaped notches having a V-shaped profile, it should be understood that the notches 1119, 1119', and/or 1119" may have a V, U, square, rectangular, round, semi-round, oval, angled, or other desired profile.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

It is also noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A firearm pin, comprising:
   a head, wherein said head extends from a shoulder to a crown; and consists of one face and one flat
   said face extending from said shoulder to said crown, wherein said face is formed at an angle of between approximately 1° and 89° relative to a longitudinal axis of said pin;
   said flat is formed substantially parallel to a longitudinal axis of said pin, and wherein said flat extends from said shoulder of said head to said crown of said head;
   a shank, wherein said shank includes an elongate, cylindrical shank portion that extends from a terminal surface to said shoulder; and
   an intermediate portion, having a reduced diameter when compared to a diameter of said shank portion, formed between said shank portion and said shoulder.

2. The firearm pin of claim 1, wherein said face is formed at an angle of 1°, 5°, 10°, 15°, 20°, 25°, 30°, 35°, 40°, 45°, 50°, 55°, 60°, 65°, 70°, 75°, 80°, 85°, or 89° relative to a longitudinal axis of said pin.

3. The firearm pin of claim 1, wherein said face has a continuous surface.

4. The firearm pin of claim 1, wherein said face has a substantially smooth surface.

5. The firearm pin of claim 1, wherein said face includes a textured surface.

6. The firearm pin of claim 1, wherein said face includes a plurality of dimples formed in a surface of said face.

7. The firearm pin of claim 1, wherein said face includes a groove said groove is formed of two side walls and wherein said side walls of said groove converge with each other.

8. The firearm pin of claim 1, wherein said shoulder extends perpendicular to a longitudinal axis of said pin.

9. The firearm pin of claim 1, wherein a chamfer is provided as a transitional surface between said terminal surface and an outer surface of said shank portion.

10. The firearm pin of claim 1, further comprising an indention formed in said terminating surface.

11. The firearm pin of claim 1, wherein said crown provides a button shape to a terminating end portion of said head.

12. The firearm pin of claim 1, further comprising an elongate slot formed in said pin, which extends along a longitudinal axis of said pin from a portion of said shank portion into a portion of said head and wherein said elongate slot includes a detent formed proximate each end of said elongate slot.

13. The firearm pin of claim 1, further comprising an elongate slot formed in said pin, which extends along a longitudinal axis of said pin within a portion of said shank portion and wherein said elongate slot includes a detent formed proximate each end of said elongate slot.

14. A firearm in combination with a pin, the pin, comprising:
   a head, wherein said head extends from a shoulder to a crown; and consists of one face and one flat
   said face extending from said shoulder to said crown, wherein said face is formed at an angle of between approximately 1° and 89° relative to a longitudinal axis of said pin;
   said flat is formed substantially parallel to a longitudinal axis of said pin, and wherein said flat extends from said shoulder of said head to said crown of said head;
   a shank, wherein said shank includes an elongate, cylindrical shank portion that extends from a terminal surface to said shoulder; and an intermediate portion, having a reduced diameter when compared to a diameter of said shank portion, formed between said shank portion and said shoulder.

15. The combination of claim 14, wherein said face includes a groove, said groove is formed of two side walls and wherein said side walls of said groove converge with each other.

* * * * *